United States Patent
Amershi et al.

(10) Patent No.: US 12,423,338 B2
(45) Date of Patent: Sep. 23, 2025

(54) EMBEDDED ATTRIBUTES FOR MODIFYING BEHAVIORS OF GENERATIVE AI SYSTEMS

(71) Applicant: Microsoft Technology Licensing, LLC, Redmond, WA (US)

(72) Inventors: Saleema Amin Amershi, Seattle, WA (US); Adam Fourney, Woodinville, WA (US); Victor Chukwuma Dibia, Santa Clara, CA (US); Gagan Bansal, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 18/197,878

(22) Filed: May 16, 2023

(65) Prior Publication Data
US 2024/0386038 A1   Nov. 21, 2024

(51) Int. Cl.
*G06F 17/00* (2019.01)
*G06F 9/00* (2006.01)
*G06F 16/3329* (2025.01)
*G06F 40/20* (2020.01)

(52) U.S. Cl.
CPC ............ *G06F 16/3329* (2019.01); *G06F 9/00* (2013.01); *G06F 40/20* (2020.01)

(58) Field of Classification Search
CPC ........ G06F 16/3329; G06F 9/00; G06F 40/20; G06F 40/143; G06F 40/205; G06F 40/279; G06F 40/35
See application file for complete search history.

(56) References Cited

U.S. PATENT DOCUMENTS

| | | | |
|---|---|---|---|
| 11,062,095 B1 * | 7/2021 | Lev-Tov | G06N 3/08 |
| 11,468,234 B2 * | 10/2022 | Alba | G06F 40/30 |
| 11,853,706 B2 * | 12/2023 | Hosseini-Asl | G06N 3/096 |
| 11,880,655 B2 * | 1/2024 | Tensmeyer | G06F 40/284 |
| 12,111,859 B2 * | 10/2024 | Siebel | G06F 40/40 |
| 2019/0163736 A1 * | 5/2019 | Sharma | G06F 16/951 |
| 2019/0213277 A1 * | 7/2019 | DeLuca | G06Q 30/0627 |
| 2022/0138410 A1 | 5/2022 | Meng et al. | |
| 2023/0205980 A1 * | 6/2023 | Brockett | G06F 40/166 715/229 |

(Continued)

FOREIGN PATENT DOCUMENTS

| | | | | |
|---|---|---|---|---|
| WO | WO-2018040341 A1 * | 3/2018 | | G06F 40/20 |
| WO | WO-2024220078 A1 * | 10/2024 | | G10H 1/0025 |

OTHER PUBLICATIONS

Liu, Zhe, et al, "Fill in the Blank: Context-Aware Automated Text Input Generation for Mobile GUI Testing", IEEE/ACM 45th International Conference on Software Engineering, Dec. 9, 2022, pp. 1-12. (Year: 2022).*

(Continued)

*Primary Examiner* — Laurie A Ries

(57) ABSTRACT

Systems and methods for directing behavior of a generative artificial intelligence (AI) system are provided. In particular, a computing device may obtain an input prompt associated with a requested task for one or more generative artificial intelligence (AI) systems, obtain one or more attributes based on the input prompt, modify the input prompt based on the one or more embedded attributes, and provide the modified input prompt to the one or more generative AI systems.

20 Claims, 10 Drawing Sheets

(56) References Cited

U.S. PATENT DOCUMENTS

| | | | | |
|---|---|---|---|---|
| 2024/0020538 A1* | 1/2024 | Socher | .................... | G06N 3/084 |
| 2024/0221731 A1* | 7/2024 | Gupta | .................... | G10L 15/063 |
| 2024/0256792 A1* | 8/2024 | Maschmeyer | .......... | G06F 40/40 |
| 2024/0289851 A1* | 8/2024 | Williams | ............ | G06F 16/3329 |
| 2024/0320444 A1* | 9/2024 | Maschmeyer | ...... | G06F 3/04845 |
| 2024/0320476 A1* | 9/2024 | Chandrasekaran | .... | G06N 20/00 |
| 2024/0354309 A1* | 10/2024 | Sacheti | ................ | G06F 16/248 |
| 2024/0354376 A1* | 10/2024 | Tandon | .................... | G06F 40/20 |
| 2024/0354503 A1* | 10/2024 | Baruch | ................ | G06F 16/345 |
| 2024/0354513 A1* | 10/2024 | Hong | .................... | G06N 5/022 |
| 2024/0354555 A1* | 10/2024 | Knipfing | .............. | G06N 3/0455 |
| 2024/0362265 A1* | 10/2024 | He | ........................ | G06F 16/538 |

OTHER PUBLICATIONS

"Getting started with GitHub Copilot—GitHub Docs," Retrieved from the Internet URL:—https://web.archive.org/web/20230428152524/https://docs.github.com/en/copilot/getting-started-with-github-copilot?tool=vscode, Apr. 28, 2023, 07 Pages.

Aghajanyan, et al., "HTLM: Hyper-Text Pre-Training and Prompting of Language Models," In Repository of arxiv. 2107. 06955, Jul. 14, 2021, 14 Pages.

International Search Report and Written Opinion received for PCT Application No. PCT/US2024/025908, Jul. 4, 2024, 12 pages.

Liu, et al., "Fill in the Blank: Context-aware Automated Text Input Generation for Mobile GUI Testing," IEEE/ACM 45th International Conference on Software Engineering, Dec. 9, 2022, 12 Pages.

\* cited by examiner

```
let systemPrompt = "I am browsing the web. Here are some passages from pages I
have open:\n\n" + getPassages(10) + "\nWith the above information in mind, help
me fill out a form on the website '" + document.title + "'.\n";

if (passage) { // Text that appears near the form field
   systemPrompt += "Part of the form reads:\n" + passage + "\n\n";
} if (label) { // Does the form field have a label?
   systemPrompt += "I am editing the form field '" + label + "'";
}
else {
  systemPrompt += "I am editing some text in a form field";
} if (aiAttribute) { // Is the form field providing an aiAttribute?
   systemPrompt += " and responses should " + aiAttribute;
} systemPrompt += ". I am giving you the instruction to '" + userPrompt + "'. With
this instruction in mind, ";

if (selectedText) { // Has the user highlighted any existing text?
   systemPrompt += " rewrite the following form input:\n" + selectedText;
}
else {
  if (textBeforeCursor) { // Is there any text already in the form field we are
continuing?
     systemPrompt += " continue the following form input:\n" + textBeforeCursor;
  }
  else {
    systemPrompt += " write some text in the form field:\n";
  }
}
```

EMBEDDED ATTRIBUTES FOR MODIFYING BEHAVIORS OF GENERATIVE AI SYSTEMS

BACKGROUND

Generative artificial intelligence (AI) prompts are instructions for generative AI systems (e.g., large language models) to guide the generative AI systems to accomplish requested tasks. Typically, generative AI behaviors are sensitive to the input prompts. The prompts are therefore often engineered to contain relevant information used to guide the generative output. For example, the information may include examples (e.g., for few-shot learning), guidance for completing the task (e.g., chain-of-thought guidance), and/or relevant context to consider for completing the task (e.g., relevant documents or passages). The prompts may be a single word, a list of words, one or more phrase, or one or more sentences.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

In accordance with examples of the present disclosure, an AI guidance system guides behaviors of generative AI systems to accomplish one or more requested tasks (i.e., generative outputs) based on an input prompt. To do so, the AI guidance system generates an additional prompt or modifies the input prompt based on one or more embedded attributes associated with one or more applications, documents, interfaces, and/or contents that are intended to communicate with the generative AI systems based on the input prompt. The embedded attributes of applications, documents, interfaces, and/or contents may be provided by the developers of applications or interfaces and/or authors of documents and contents. In other words, the behaviors of generative AI systems may be customized or directed by users (e.g., developers and/or authors) at a finer level (e.g., by enabling different prompt augmentations on any document or user interface element) using embedded attributes. It should be appreciated that utilizing embedded attributes that can supplement input prompts may reduce effort for the current practice of writing lengthy custom prompts to capture context. It should also be appreciated that the embedded attributes may direct the behaviors of the generative AI systems on either a client or server side.

In accordance with at least one example of the present disclosure, a method for directing behavior of a generative artificial intelligence (AI) system is provided. The method may include obtaining an input prompt associated with a requested task for one or more generative AI systems, obtaining one or more attributes based on the input prompt, modifying the input prompt based on the one or more embedded attributes, and providing the modified input prompt to the one or more generative AI systems.

In accordance with at least one example of the present disclosure, a method for directing behavior of a generative artificial intelligence (AI) system is provided. The method may include obtaining an input prompt associated with a requested task for one or more generative AI systems, obtaining one or more attributes based on the input prompt, generating, in response to determining that the one or more attributes exist, a supplemental prompt based on the one or more attributes, and providing the supplemental prompt and the input prompt to the one or more generative AI systems.

In accordance with at least one example of the present disclosure, a computing device for directing behavior of a generative artificial intelligence (AI) system is provided. The computing device may include a processor and a memory having a plurality of instructions stored thereon that, when executed by the processor, causes the computing device to obtain an input prompt associated with a requested task for one or more generative artificial intelligence (AI) systems, obtain one or more attributes based on the input prompt, modify the input prompt based on the one or more embedded attributes, and provide the modified input prompt to the one or more generative AI systems.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

FIG. 3A illustrates an example meta-prompt in JavaScript for guiding one or more generative AI systems to fill out a form on a website in accordance with examples of the present disclosure.

FIG. 3C depicts a screenshot of the HTML code of the web page shown in FIG. 3B that includes attributes for guiding the one or more generative AI systems to write a summary of the sample project.

DETAILED DESCRIPTION

Figure 1:
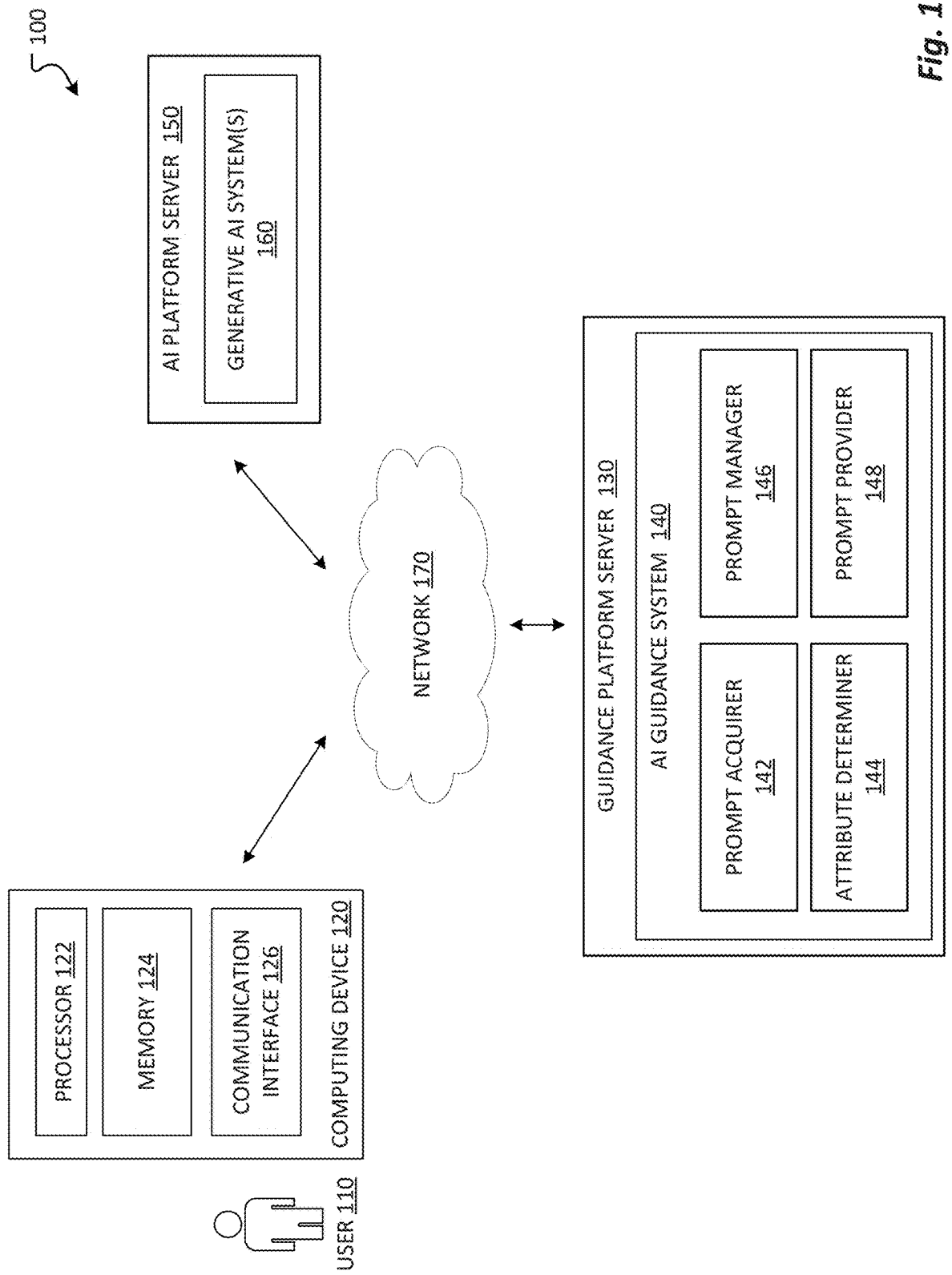
FIG. 1 depicts a block diagram of an example of an operating environment in which an AI guidance system may be implemented in accordance with examples of the present disclosure.

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Generative AI prompts are instructions for generative AI systems (e.g., large language models) to guide the generative AI systems to accomplish requested tasks. Typically, generative AI behaviors are sensitive to these input prompts. The prompts are therefore often engineered to contain relevant information used to guide the generative output. For example, the information may include examples (e.g., for few-shot learning), guidance for completing the task (e.g., chain-of-thought guidance), and/or relevant context to consider for completing the task (e.g., relevant documents or passages). The prompts may be a single word, a list of words, one or more phrase, or one or more sentences.

Current approaches to steering generative AI behaviors generally include generating or enriching prompts for the generative AI systems. For example, users may generate free form prompts to guide AI behaviors to perform requested tasks. Alternatively, or additionally, prompts may be automatically enriched with on demand data before requesting a generative output. In some example, some of text of a prompt may be hard coded to guide the interaction (e.g., prompts for sentimental analysis or summarization). However, it may be challenging for the users and developers to guide the generative AI behaviors customized for a specific content or application.

In accordance with examples of the present disclosure, an AI guidance system guides behaviors of generative AI systems to accomplish one or more requested tasks (i.e., generative outputs) based on an input prompt. To do so, the AI guidance system generates an additional prompt or modifies the input prompt based on one or more embedded attributes associated with one or more applications, documents, interfaces, and/or contents that are intended to communicate with the generative AI systems based on the input prompt. The embedded attributes of applications, documents, interfaces, and/or contents may be provided by the developers of applications or interfaces and/or authors of documents and contents. For example, the embedded attributes may be tags, hints, markups, or any indication that provide additional instructions to the generative AI systems. In other words, the behaviors of generative AI systems may be customized or directed by users (e.g., developers and/or authors) at a finer level (e.g., by enabling different prompt augmentations on any document or user interface element) using embedded attributes. For example, the embedded attributes may be received via a developer tool, a productivity application, or another application used to create a document, application, webpage, etc. It should be appreciated that the embedded attributes are scalable. In other words, utilizing embedded attributes that can supplement input prompts may reduce effort for the current practice of writing lengthy custom prompts to capture context. It should also be appreciated that the embedded attributes may direct the behaviors of the generative AI systems on either a client or server side.

FIG. 1 depicts a block diagram of an example of an operating environment 100 in which an AI guidance system may be implemented in accordance with examples of the present disclosure. To do so, the operating environment 100 includes a computing device 120 associated with the user 110. The operating environment 100 may further include one or more remote devices, such as an AI platform server 150 and a guidance platform server 130, that are communicatively coupled to the computing device 120 via a network 170. The network 170 may include any kind of computing network including, without limitation, a wired or wireless local area network (LAN), a wired or wireless wide area network (WAN), and/or the Internet.

The AI platform server 150 includes one or more generative AI systems 160 and is configured to render the one or more generative AI systems 160. The generative AI systems 160 may include a generative large language machine learning model, a transformer model, other type of machine learning models, or a combination of models. The computing device 120 has a processor 122, a memory 124, and a communication interface 126. The computing device 120 may be, but is not limited to, a computer, a notebook, a laptop, a mobile device, a smartphone, a tablet, a portable device, or any other suitable computing device that is capable of communicating with the one or more generative AI systems 160. It should be appreciated that, in some aspects, the computing device 120 may execute the one or more generative AI systems 160.

The guidance platform server 130 includes an AI guidance system 140 that is configured to communicate with the computing device 120 and the AI platform sever 150. However, it should be appreciated that, in some aspects, the AI guidance system 140 may be executed on the AI platform server 150 and/or the computing device 120. The AI guidance system 140 is further configured to guide behaviors of generative AI systems by supplementing or modifying an input prompt for the one or more generative AI systems to accomplish one or more requested tasks (i.e., generative outputs) based on the input prompt. Specifically, the AI guidance system 140 is configured to generate an additional prompt or modify the input prompt based on one or more embedded attributes associated with one or more applications, documents, interfaces, and/or contents that are intended to communicate with the generative AI systems based on the input prompt.

It should be appreciated that the embedded attributes need not be human-interpretable. For example, the embedded attributes may simply provide an embedding vector or otherwise refer to some points or directions in a latent space of an AI model. This allows the embedded attributes to convey concepts that are hard to put into words (e.g., style cues). In some aspects, the embedded attributes may be keys that can pull embedded attributes from a store, such that proprietary prompt information would not be revealed to the users. The embedded attributes may evolve into a broader internet communication protocol that supports the use of large language model (LLM) agents (e.g., IoT devices) acting on behalf of users to address certain tasks. To do so, the AI guidance system 140 includes a prompt receiver 142, an attribute determiner 144, a prompt manager 146, and a prompt provider 148.

The prompt acquirer 142 is configured to receive, obtain, or otherwise acquire a prompt for one or more generative AI systems 160. For example, the user 110 may provide a prompt for one or more generative AI systems 160. The prompt is an input or a query that the user 110 or a program provides to the one or more generative AI systems 160 in order to elicit a requested output or response from the one or more generative AI systems 160. The prompt describes the requested task to be performed by the one or more generative AI systems 160. The prompt may be natural language sentences or questions, or code snippets or commands, or any combination of text or code.

The attribute determiner 144 is configured to determine one or more applications, documents, interfaces, and/or contents that are configured to communicate with the generative AI system in order to perform the requested tasks based on a prompt. The attribute determiner 144 is further configured to determine if one or more embedded attributes are associated with the one or more applications, documents, interfaces, and/or contents. As described above, the embedded attributes of applications, documents, interfaces, and/or contents may be provided by the developers of applications or interfaces and/or authors of documents and contents. Users (e.g., developers or authors) may enable different prompt augmentations on any document or user interface element using embedded attributes. For example, the embedded attributes may be tags, hints, markups, or any indication that provide additional instructions to the generative AI systems. It should be appreciated that utilizing embedded attributes that can supplement input prompts may reduce effort for the current practice of writing lengthy custom prompts to capture context. It should also be appreciated that the embedded attributes may direct the behaviors of the generative AI systems on either a client or server side.

The prompt manager 146 is configured to generate a new supplemental prompt and/or modify an original prompt input by a user for one or more generative AI systems based on the one or more embedded attributes.

The prompt provider 148 is configured to provide one or more prompts to one or more generative AI systems. The one or more prompts may include a new supplemental prompt, a modified prompt, and/or the original input prompt. For example, the prompt provider 148 is configured to a new supplement prompt with an original input prompt to the one or more generative AI systems.

Figure 2:
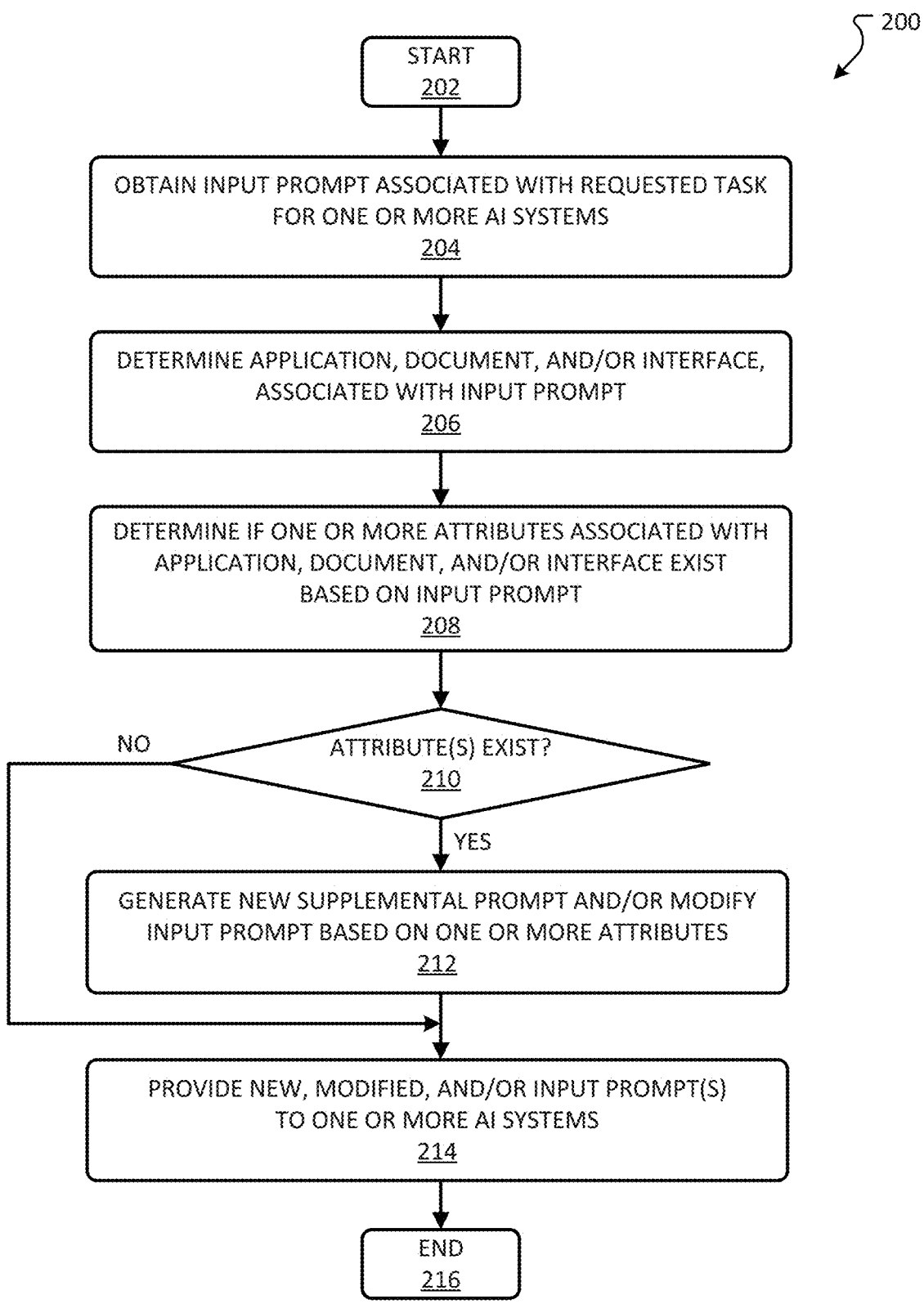
FIG. 2 depicts a flowchart of an example method of directing behaviors of one or more generative AI systems in accordance with examples of the present disclosure.

Referring now to FIG. 2, a method 200 for directing behaviors of one or more generative AI systems in accordance with examples of the present disclosure is provided. A general order for the steps of the method 200 is shown in FIG. 2. Generally, the method 200 starts at 202 and ends at 216. The method 200 may include more or fewer steps or may arrange the order of the steps differently than those shown in FIG. 2. In the illustrative aspect, the method 200 is performed by a server (e.g., a guidance platform server 130). However, it should be appreciated that one or more steps of the method 200 may be performed by another device (e.g., an AI platform server 150 and/or a computing device 120).

Specifically, in some aspects, the method 200 may be performed by an AI guidance system (e.g., 140) executed on the guidance platform server 130. For example, the AI guidance system 140 may be any tool that is capable of generating a new prompt or modifying an existing prompt and is communicatively coupled to a computing device providing an input prompt (e.g., the computing device 120) and one or more generative systems 160. For example, the guidance platform server 130 may be any suitable computing device that is capable of communicating with the computing device 120. For example, the computing device 120 may be, but is not limited to, a computer, a notebook, a laptop, a mobile device, a smartphone, a tablet, a portable device, or any other suitable computing device that is capable of communicating with one or more generative AI systems (e.g., 160). The method 200 can be executed as a set of computer-executable instructions executed by a computer system and encoded or stored on a computer readable medium. Further, the method 200 can be performed by gates or circuits associated with a processor, Application Specific Integrated Circuit (ASIC), a field programmable gate array (FPGA), a system on chip (SOC), or other hardware device. Hereinafter, the method 200 shall be explained with reference to the systems, components, modules, software, data structures, user interfaces, etc. described in conjunction with FIG. 1 and FIGS. 4-7.

The method 200 starts at operation 202, where flow may proceed to 204. At operation 204, the AI guidance system 140 obtains an input prompt for one or more generative AI systems 160. The input prompt is an input or a query that a user or a program provides to the one or more generative AI systems 160 in order to elicit a requested output or response from the one or more generative AI systems. The input prompt describes the requested task to be performed by the one or more generative AI systems 160. As described above, the input prompt may be natural language sentences or questions, or code snippets or commands, or any combination of text or code.

At operation 206, the AI guidance system 140 determines one or more applications, documents, interfaces, and/or contents associated with the input prompt. For example, the AI guidance system 140 determines one or more applications, documents, interfaces, and/or contents that are intended to be used to perform the requested output based on the input prompt.

At operation 208, the AI guidance system 140 determines if one or more embedded attributes are associated with the one or more applications, documents, interfaces, and/or contents. If the AI guidance system 140 determines that the one or more embedded attributes exist at operation 210, the method 200 advances to operation 212.

At operation 212, the AI guidance system 140 generates a new supplemental prompt and/or modifies the input prompt based on the one or more attributes.

At operation 214, the AI guidance system 140 provides one or more prompts to the one or more generative AI systems. The one or more prompts may include a new supplemental prompt, a modified prompt, and/or the original input prompt. It should be appreciated that the new supplement prompt is provided with the original input prompt to the one or more generative AI systems.

Referring back to operation 210, if the AI guidance system 140 determines that an embedded attribute does not exist at operation 210, the method 200 skips ahead to operation 214 to provide the original input prompt to the one or more generative AI systems.

For example, consider an email client leveraging large language models to help a user write emails (e.g., autocomplete or smart replies). The developer of the email application may include an embedded attribute around the HTML textArea of the email body that provides guidance to the AI to write in the same tone as other emails previously sent to a particular recipient. In such an example, a user may provide an input prompt to a large language models (LLM) AI to send an email via the email application to a recipient. The AI guidance system obtains the input prompt and determines that the email application includes the embedded attribute around the HTML textArea of the email body. Based on the embedded attribute, the AI guidance system may generate a supplement prompt and provide the original input prompt with the supplemental prompt to the LLM AI. Additionally, or alternatively, the AI guidance system may modify the input prompt based on the embedded attribute and provide the modified input prompt to the LLM AI.

Based on the given prompt(s), the LLM AI would generate an email to the recipient in the same tone as other emails previously sent to the recipient for the user.

In other example, an internet forum or social media site may post one or more embedded attributes to guide the tone of a discussion or to guide a writing assistance so that it does not violate forum rules or norms (e.g., forums often have rules against self-promotion or off-topic discussion). In such an example, a user may provide an input prompt to a large language models (LLM) AI to generate a post with the latest photo and a relevant description on a social media site. The AI guidance system obtains the input prompt and determines that the social media site includes the embedded attribute indicating rules and restrictions regarding size of the photo and text. Based on the embedded attribute, the AI guidance system may generate a supplement prompt and provide the original input prompt with the supplemental prompt to the LLM AI. Additionally, or alternatively, the AI guidance system may modify the input prompt based on the embedded attribute and provide the modified input prompt to the LLM AI. Based on the given prompt(s), the LLM AI would generate a post with the latest photo in a particular size and a description that follows the rules (e.g., using hashtags) for the user.

In other example, consider a webpage containing free form text fields intended to collect responses from users (e.g., application forms, compliance and legal forms, etc.). The webpage author may include different embedded attributes around each HTML textArea containing examples of appropriate responses that can be used as guidance to the AI. For example, a job application webpage may contain a free form text field for applicants to write a short description of their fit for the job and a text field for applicants to write a short description of their relevant experience. The embedded attributes around the textAreas may include examples of appropriate responses. In such an example, a user may provide an input prompt to a large language models (LLM) AI to fill text fields in a particular job application webpage. In response, the AI guidance system obtains the input prompt and determines that the job application webpage includes the embedded attributes around the textAreas. Based on the embedded attribute, the AI guidance system may generate a supplement prompt and provide the original input prompt with the supplemental prompt to the LLM AI. Additionally, or alternatively, the AI guidance system may modify the input prompt based on the embedded attribute and provide the modified input prompt to the LLM AI. Based on the given prompt(s), the LLM AI would generate fill out each text fields based on the format and requirements described in the embedded attributes for the user.

FIG. 3A provides an example meta-prompt 300 in JavaScript of the text fields example described above in accordance with examples of the present disclosure. The meta-prompt 300 is configured to guide a large language models (LLM) AI to fill out a form on a website based on a "userPrompt" (i.e., an input prompt provided by a user) as illustrated in 304. In the meta-prompt 300, the LLM AI determines, for example, whether there is text that appears near the form field, whether the form field has a label, and whether the user highlighted any existing text to fill out the requested form. Additionally, the LLM AI determines whether the form field being edited provides an "aiAttribute" (i.e., one or more embedded attributes around the form field) as illustrated in 302. Based on the user prompt 304.

Figure 3B:
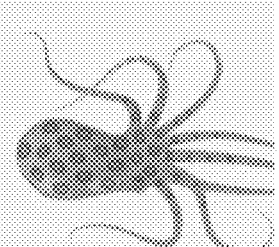
FIG. 3B depicts a screenshot of an exemplary web page with a user prompt provided to one or more generative AI systems for requesting to write a summary of the sample project.
Figure 3C:
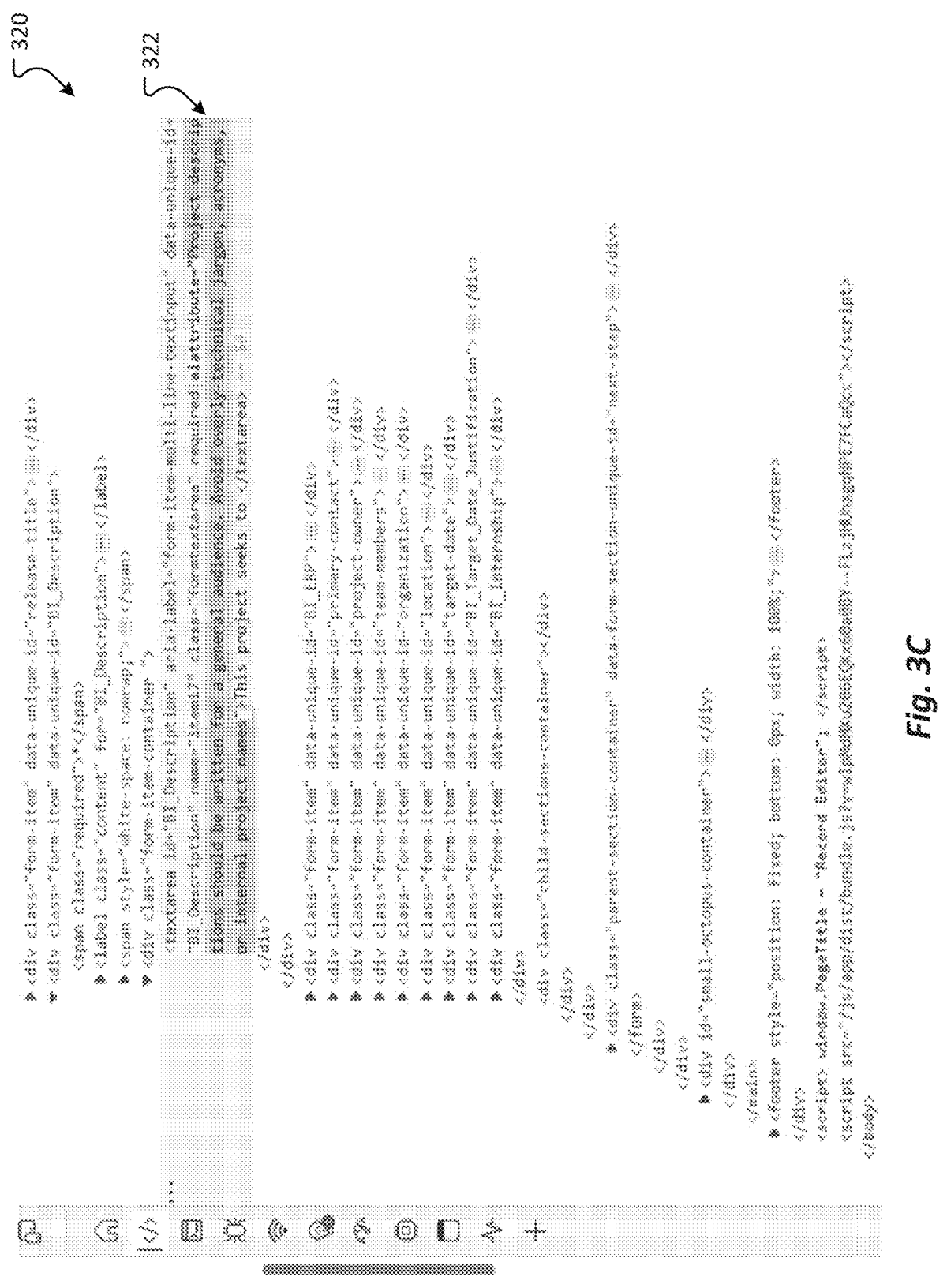

FIGS. 3B and 3C illustrate an example web page with embedded attributes for guiding one or more generative AI systems for performing a requested task based on a user prompt. For example, a user may access a web page for submitting a project on an Ethics Review Portal. As depicted in a screenshot of FIG. 3B, the web page 310 may include a fillable textArea 312 for providing a brief description of the project and its objective. The user may utilize one or more generative AI systems for filling out the form. To do so, the user may provide a user prompt to the one or more generative AI systems to "write a summary of the sample project." Additionally, an author of the Ethics Review Portal web page 310 may include one or more embedded attributes around the HTML textAreas on the web page for guiding the one or more generative AI systems. For example, as depicted in a screenshot 320 of the HTML (HyperText Markup Language) code of the web page FIG. 3C, the attributes 322 may be embedded in the HTML textArea around the project description field 312 indicating that "Project description should be written for a general audience. Avoid overly-technical jargon, acronyms, or internal project names."

Figure 4A:
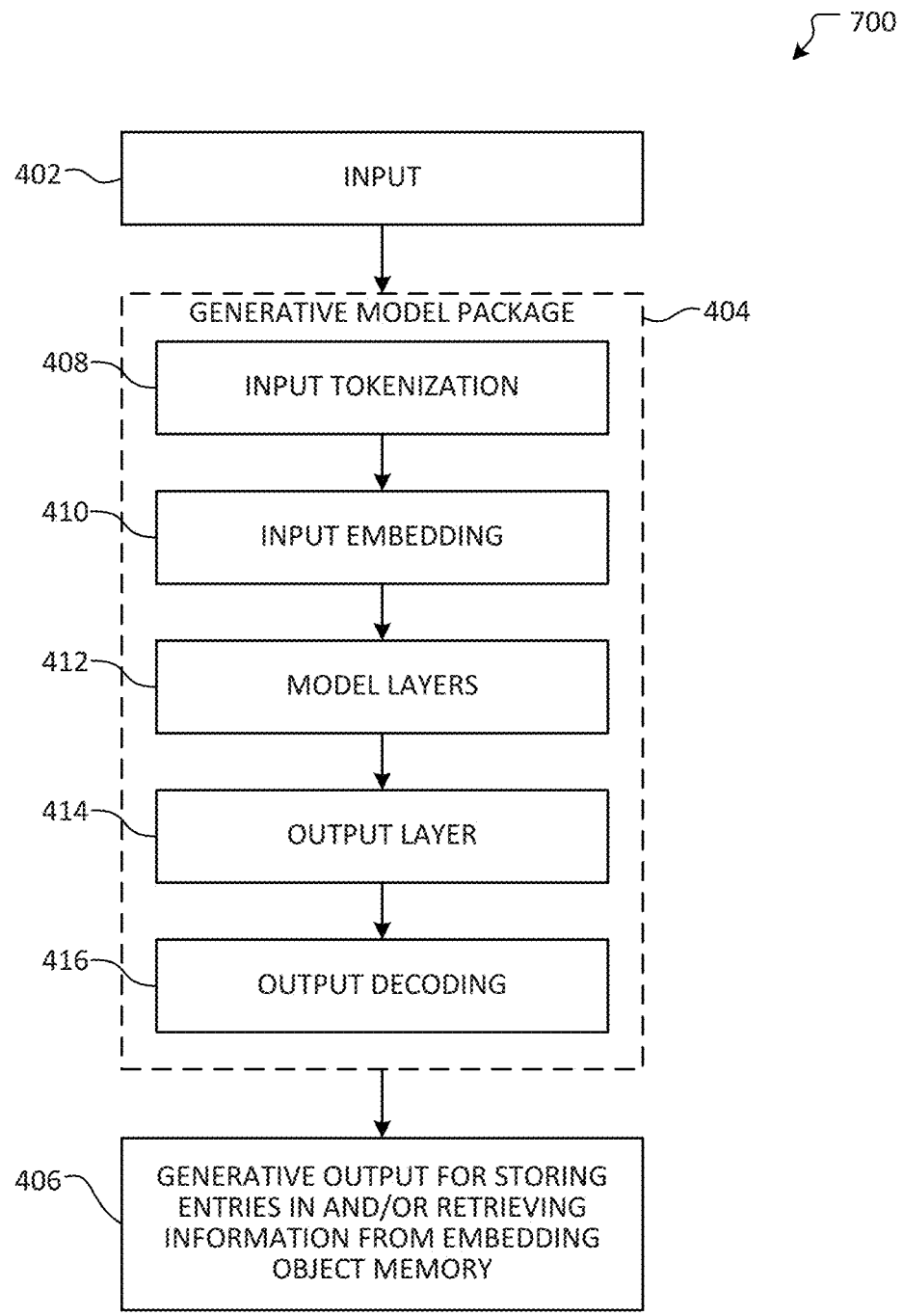
FIGS. 4A and 4B illustrate overviews of an example generative machine learning model that may be used in accordance with examples of the present disclosure.
Figure 4B:
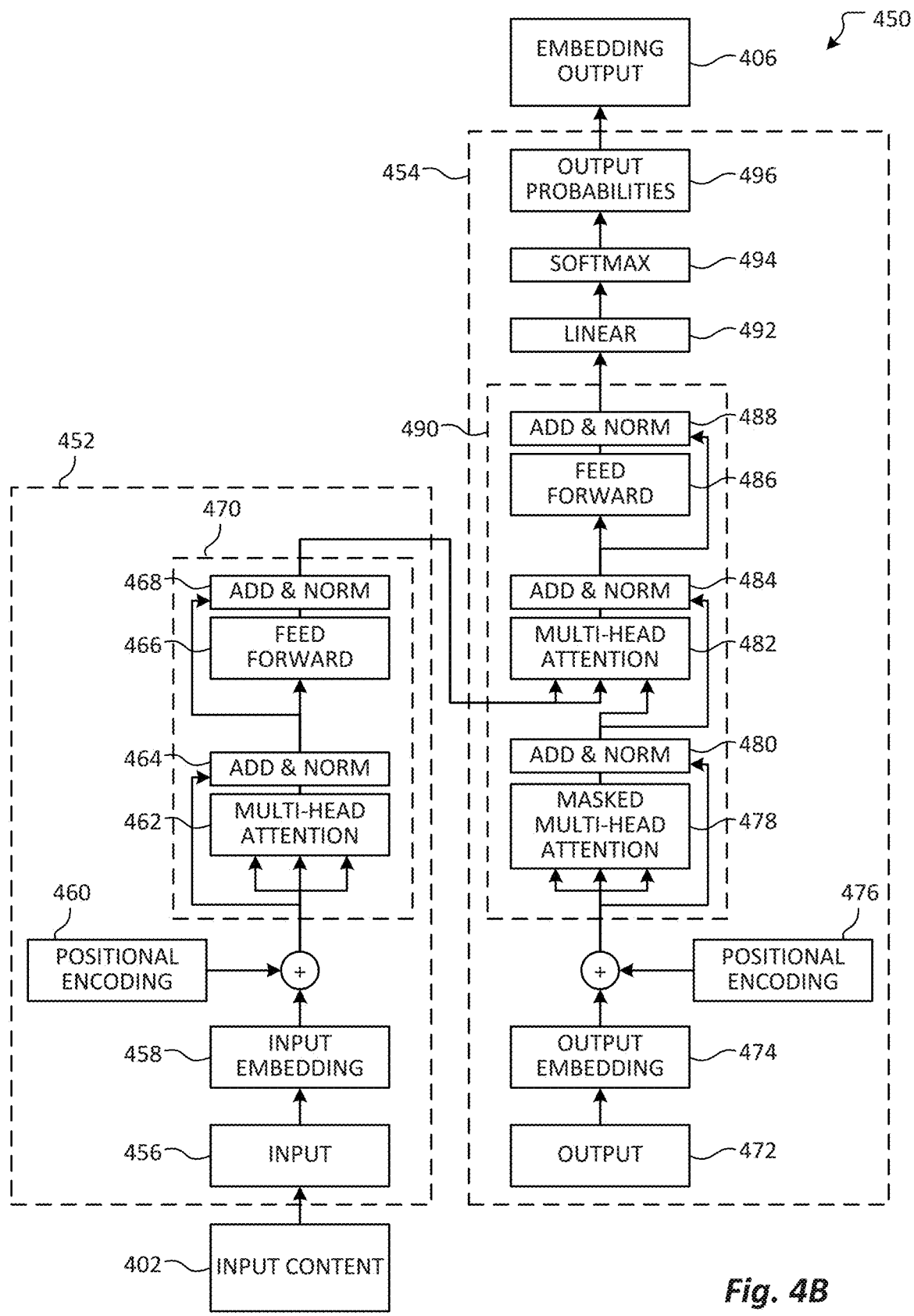

FIGS. 4A and 4B illustrate overviews of an example generative machine learning model that may be used according to aspects described herein. With reference first to FIG. 4A, conceptual diagram 400 depicts an overview of pre-trained generative model package 404 that processes an input 402 to generate model output for storing entries in and/or retrieving information from a generative model output 406 (e.g., suggestions and/or suggested modifications) according to aspects described herein.

In examples, generative model package 404 is pre-trained according to a variety of inputs (e.g., a variety of human languages, a variety of programming languages, and/or a variety of content types) and therefore need not be finetuned or trained for a specific scenario. Rather, generative model package 404 may be more generally pre-trained, such that input 402 includes a prompt that is generated, selected, or otherwise engineered to induce generative model package 404 to produce certain generative model output 406. It will be appreciated that input 402 and generative model output 406 may each include any of a variety of content types, including, but not limited to, text output, image output, audio output, video output, programmatic output, and/or binary output, among other examples. In examples, input 402 and generative model output 406 may have different content types, as may be the case when generative model package 404 includes a generative multimodal machine learning model.

As such, generative model package 404 may be used in any of a variety of scenarios and, further, a different generative model package may be used in place of generative model package 404 without substantially modifying other associated aspects (e.g., similar to those described herein with respect to FIGS. 1-3). Accordingly, generative model package 404 operates as a tool with which machine learning processing is performed, in which certain inputs 402 to generative model package 404 are programmatically generated or otherwise determined, thereby causing generative model package 404 to produce model output 406 that may subsequently be used for further processing.

Generative model package 404 may be provided or otherwise used according to any of a variety of paradigms. For example, generative model package 404 may be used local to a computing device (e.g., the computing device 140 in FIG. 1) or may be accessed remotely from a machine learning service (e.g., the server 160 in FIG. 1). In other examples, aspects of generative model package 404 are distributed across multiple computing devices. In some instances, generative model package 404 is accessible via an application programming interface (API), as may be provided by an operating system of the computing device and/or by the machine learning service, among other examples.

With reference now to the illustrated aspects of generative model package 404, generative model package 404 includes input tokenization 408, input embedding 410, model layers 412, output layer 414, and output decoding 416. In examples, input tokenization 408 processes input 402 to generate input embedding 410, which includes a sequence of symbol representations that corresponds to input 402. Accordingly, input embedding 410 is processed by model layers 412, output layer 414, and output decoding 416 to produce model output 406. An example architecture corresponding to generative model package 404 is depicted in FIG. 4B, which is discussed below in further detail. Even so, it will be appreciated that the architectures that are illustrated and described herein are not to be taken in a limiting sense and, in other examples, any of a variety of other architectures may be used.

FIG. 4B is a conceptual diagram that depicts an example architecture 450 of a pre-trained generative machine learning model that may be used according to aspects described herein. As noted above, any of a variety of alternative architectures and corresponding ML models may be used in other examples without departing from the aspects described herein.

As illustrated, architecture 450 processes input 402 to produce generative model output 406, aspects of which were discussed above with respect to FIG. 4A. Architecture 450 is depicted as a transformer model that includes encoder 452 and decoder 454. Encoder 452 processes input embedding 458 (aspects of which may be similar to input embedding 410 in FIG. 4A), which includes a sequence of symbol representations that corresponds to input 456. In examples, input 456 includes content data 402 corresponding to a content item.

Further, positional encoding 460 may introduce information about the relative and/or absolute position for tokens of input embedding 458. Similarly, output embedding 474 includes a sequence of symbol representations that correspond to output 472, while positional encoding 476 may similarly introduce information about the relative and/or absolute position for tokens of output embedding 474.

As illustrated, encoder 452 includes example layer 470. It will be appreciated that any number of such layers may be used, and that the depicted architecture is simplified for illustrative purposes. Example layer 470 includes two sub-layers: multi-head attention layer 462 and feed forward layer 466. In examples, a residual connection is included around each layer 462, 466, after which normalization layers 464 and 468, respectively, are included.

Decoder 454 includes example layer 490. Similar to encoder 452, any number of such layers may be used in other examples, and the depicted architecture of decoder 454 is simplified for illustrative purposes. As illustrated, example layer 490 includes three sub-layers: masked multi-head attention layer 478, multi-head attention layer 482, and feed forward layer 486. Aspects of multi-head attention layer 482 and feed forward layer 486 may be similar to those discussed above with respect to multi-head attention layer 462 and feed forward layer 466, respectively. Additionally, masked multi-head attention layer 478 performs multi-head attention over the output of encoder 452 (e.g., output 472). In examples, masked multi-head attention layer 478 prevents positions from attending to subsequent positions. Such masking, combined with offsetting the embeddings (e.g., by one position, as illustrated by multi-head attention layer 482), may ensure that a prediction for a given position depends on known output for one or more positions that are less than the given position. As illustrated, residual connections are also included around layers 478, 482, and 486, after which normalization layers 480, 484, and 488, respectively, are included.

Multi-head attention layers 462, 478, and 482 may each linearly project queries, keys, and values using a set of linear projections to a corresponding dimension. Each linear projection may be processed using an attention function (e.g., dot-product or additive attention), thereby yielding n-dimensional output values for each linear projection. The resulting values may be concatenated and once again projected, such that the values are subsequently processed as illustrated in FIG. 4B (e.g., by a corresponding normalization layer 464, 480, or 484).

Feed forward layers 466 and 486 may each be a fully connected feed-forward network, which applies to each position. In examples, feed forward layers 466 and 486 each include a plurality of linear transformations with a rectified linear unit activation in between. In examples, each linear transformation is the same across different positions, while different parameters may be used as compared to other linear transformations of the feed-forward network.

Additionally, aspects of linear transformation 492 may be similar to the linear transformations discussed above with respect to multi-head attention layers 462, 478, and 482, as well as feed forward layers 466 and 486. Softmax 494 may further convert the output of linear transformation 492 to predicted next-token probabilities, as indicated by output probabilities 496. It will be appreciated that the illustrated architecture is provided in as an example and, in other examples, any of a variety of other model architectures may be used in accordance with the disclosed aspects.

Accordingly, output probabilities 496 may thus form generative model output 406 according to aspects described herein, such that the output of the generative ML model (e.g., which may include one or more semantic embeddings and one or more retrieved content items) is used as input for determining an action according to aspects described herein. In other examples, generative model output 406 is provided as generated output for retrieving one or more previously captured content items.

Figure 5:
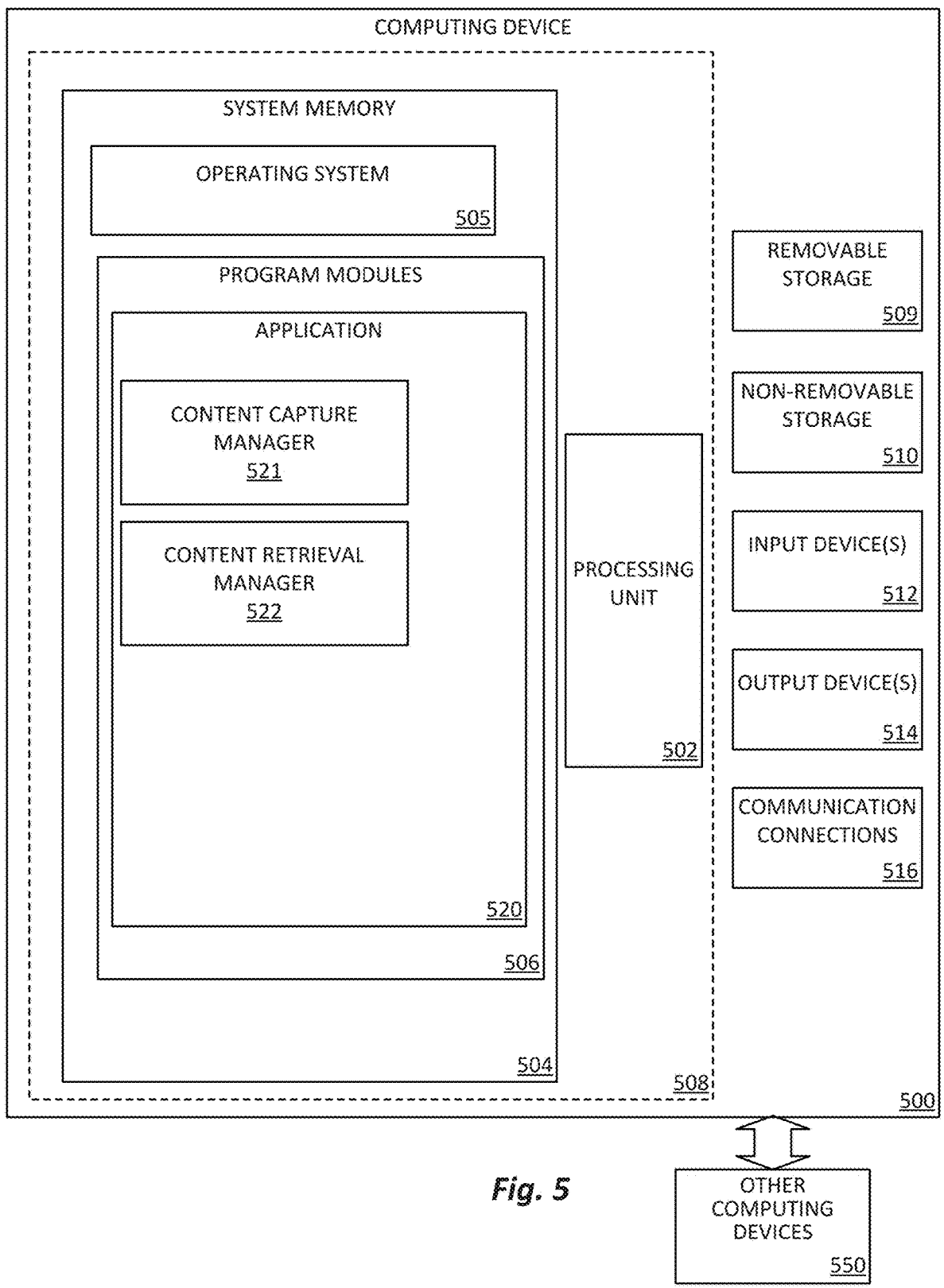
FIG. 5 is a block diagram illustrating example physical components of a computing device with which aspects of the disclosure may be practiced.
Figure 6:
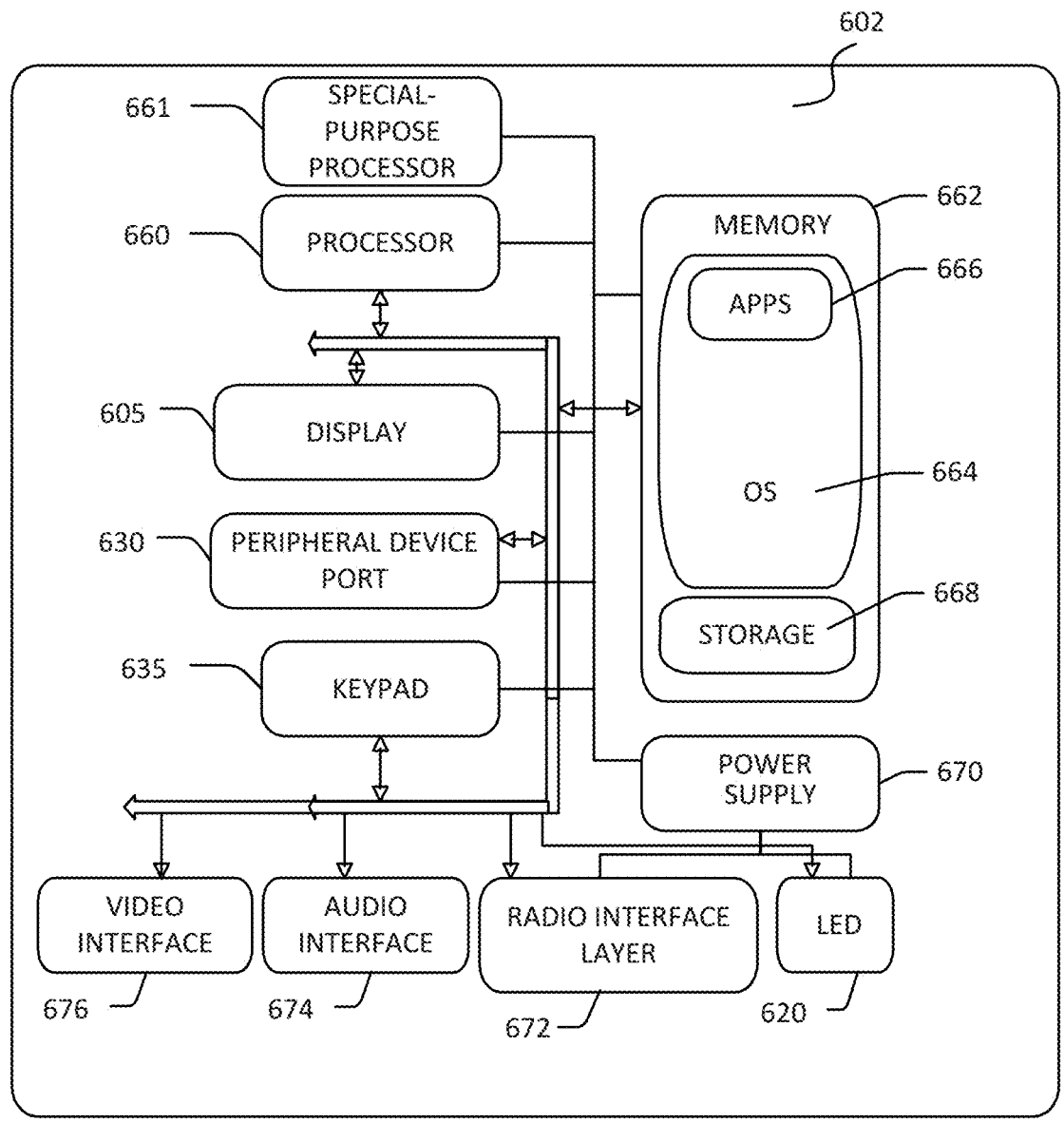
FIG. 6 is a simplified block diagram of a computing device with which aspects of the present disclosure may be practiced.
Figure 7:
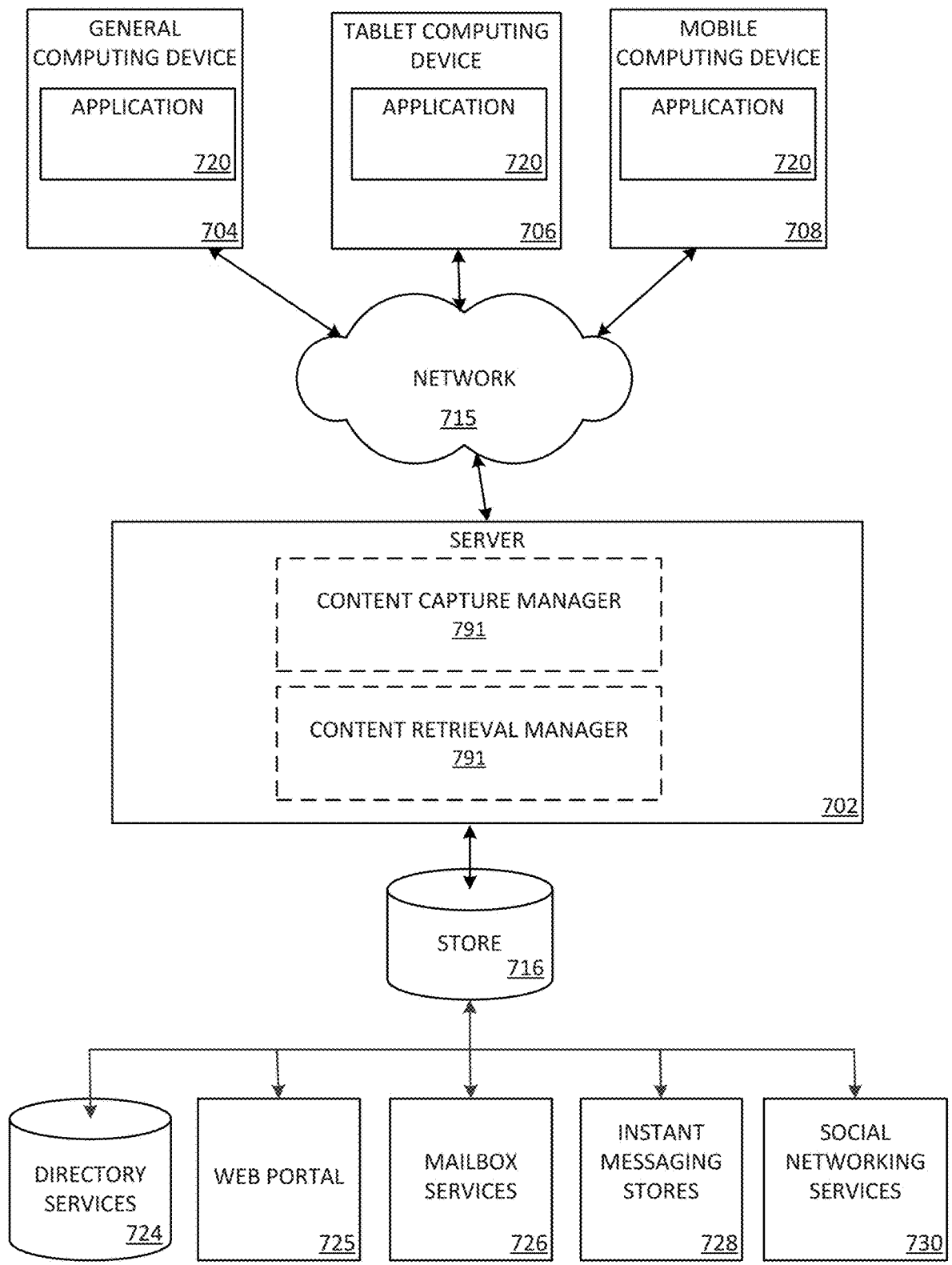
FIG. 7 is a simplified block diagram of a distributed computing system in which aspects of the present disclosure may be practiced.

FIGS. 5-7 and the associated descriptions provide a discussion of a variety of operating environments in which aspects of the disclosure may be practiced. However, the devices and systems illustrated and discussed with respect to FIGS. 5-7 are for purposes of example and illustration and are not limiting of a vast number of computing device configurations that may be utilized for practicing aspects of the disclosure, described herein.

FIG. 5 is a block diagram illustrating physical components (e.g., hardware) of a computing device 500 with which aspects of the disclosure may be practiced. The computing device components described below may be suitable for the computing devices described above, including one or more devices associated with machine learning service (e.g., productive platform server 160), as well as computing device 140 discussed above with respect to FIG. 1. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories.

The system memory 504 may include an operating system 505 and one or more program modules 506 suitable for running software application 520, such as one or more components supported by the systems described herein. As examples, system memory 504 may store a content capture manager 521 and/or a content retrieval manager 522. The operating system 505, for example, may be suitable for controlling the operation of the computing device 500.

Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 6 illustrates a system 600 that may, for example, be a mobile computing device, such as a mobile telephone, a smart phone, wearable computer (such as a smart watch), a tablet computer, a laptop computer, and the like, with which aspects of the disclosure may be practiced. In one example, the system 600 is implemented as a "smart phone" capable of running one or more applications (e.g., browser, e-mail, calendaring, contact managers, messaging clients, games, and media clients/players). In some aspects, the system 600 is integrated as a computing device, such as an integrated personal digital assistant (PDA) and wireless phone.

In a basic configuration, such a mobile computing device is a handheld computer having both input elements and output elements. The system 600 typically includes a display 605 and one or more input buttons that allow the user to enter information into the system 600. The display 605 may also function as an input device (e.g., a touch screen display).

If included, an optional side input element allows further user input. For example, the side input element may be a rotary switch, a button, or any other type of manual input element. In alternative aspects, system 600 may incorporate more or less input elements. For example, the display 605 may not be a touch screen in some aspects. In another example, an optional keypad 635 may also be included, which may be a physical keypad or a "soft" keypad generated on the touch screen display.

In various aspects, the output elements include the display 605 for showing a graphical user interface (GUI), a visual indicator (e.g., a light emitting diode 620), and/or an audio transducer 625 (e.g., a speaker). In some aspects, a vibration transducer is included for providing the user with tactile feedback. In yet another aspect, input and/or output ports are included, such as an audio input (e.g., a microphone jack), an audio output (e.g., a headphone jack), and a video output (e.g., a HDMI port) for sending signals to or receiving signals from an external device.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 600 also includes a non-volatile storage area 668 within the memory 662. The non-volatile storage area 668 may be used to store persistent information that should not be lost if the system 600 is powered down. The application programs 666 may use and store information in the non-volatile storage area 668, such as e-mail or other messages used by an e-mail application, and the like. A synchronization application (not shown) also resides on the system 600 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the system 600 described herein (e.g., a content capture manager, a content retrieval manager, etc.).

The system 600 has a power supply 670, which may be implemented as one or more batteries. The power supply 670 might further include an external power source, such as an AC adapter or a powered docking cradle that supplements or recharges the batteries.

The system 600 may also include a radio interface layer 672 that performs the function of transmitting and receiving radio frequency communications. The radio interface layer 672 facilitates wireless connectivity between the system 600 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with aspects of the present disclosure, the microphone may also serve as an audio sensor to facilitate control of notifications, as will be described below. The system 600 may further include a video interface 676 that enables an operation of an on-board camera 630 to record still images, video stream, and the like.

It will be appreciated that system 600 may have additional features or functionality. For example, system 600 may also include additional data storage devices (removable and/or non-removable) such as, magnetic disks, optical disks, or tape. Such additional storage is illustrated in FIG. 6 by the non-volatile storage area 668.

Data/information generated or captured and stored via the system 600 may be stored locally, as described above, or the data may be stored on any number of storage media that may be accessed by the device via the radio interface layer 672 or via a wired connection between the system 600 and a separate computing device associated with the system 600, for example, a server computer in a distributed computing network, such as the Internet. As should be appreciated, such data/information may be accessed via the radio interface layer 672 or via a distributed computing network. Similarly, such data/information may be readily transferred between computing devices for storage and use according to any of a variety of data/information transfer and storage means, including electronic mail and collaborative data/information sharing systems.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 724, a web portal 725, a mailbox service 726, an instant messaging store 728, or a social networking site 730.

An application 720 (e.g., similar to the application 520) may be employed by a client that communicates with server device 702. Additionally, or alternatively, a content capture manager 791 and/or a content retrieval manger 792 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these examples of the computing devices may obtain content from the store 716, in addition to receiving graphical data useable to be either pre-processed at a graphic-originating system, or post-processed at a receiving computing system.

It will be appreciated that the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The example systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the example aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Example hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

In accordance with at least one example of the present disclosure, a method for directing behavior of a generative artificial intelligence (AI) system is provided. The method may include obtaining an input prompt associated with a requested task for one or more generative AI systems, obtaining one or more attributes based on the input prompt, modifying the input prompt based on the one or more embedded attributes, and providing the modified input prompt to the one or more generative AI systems.

In accordance with at least one aspect of the above method, the method may include where obtaining one or more embedded attributes based on the input prompt includes determining if the one or more embedded attributes are embedded in one or more applications, documents, interfaces, and/or contents that are intended to communicate with the one or more generative AI systems to perform the requested task based on the input prompt.

In accordance with at least one aspect of the above method, the method may include where the one or more embedded attributes are received via one or more development tools of applications or interfaces and/or productivity tools used to generate documents or other type of content.

In accordance with at least one aspect of the above method, the method may include where the one or more embedded attributes include one or more tags, hints, markups, or indications that provide additional instructions to the one or more generative AI systems.

In accordance with at least one aspect of the above method, the method may include where the one or more embedded attributes are embedded in an online forum or a social media site and are designed to guide a tone of a discussion or to guide a writing assistance to follow rules of the online forum or the social media site.

In accordance with at least one aspect of the above method, the method may include where the one or more embedded attributes are different embedded attributes around each text field on a webpage and include examples of appropriate responses that can be used as guidance to the one or more generative AI systems.

In accordance with at least one aspect of the above method, the method may include where the one or more generative AI systems includes one or more generative large language machine learning models, one or more transformer models, and/or a combination of machine learning models.

In accordance with at least one example of the present disclosure, a method for directing behavior of a generative artificial intelligence (AI) system is provided. The method may include obtaining an input prompt associated with a requested task for one or more generative AI systems, obtaining one or more attributes based on the input prompt, generating, in response to determining that the one or more attributes exist, a supplemental prompt based on the one or more attributes, and providing the supplemental prompt and the input prompt to the one or more generative AI systems.

In accordance with at least one aspect of the above method, the method may include where obtaining one or more embedded attributes based on the input prompt includes determining if the one or more embedded attributes are embedded in one or more applications, documents, interfaces, and/or contents that are intended to communicate with the one or more generative AI systems to perform the requested task based on the input prompt.

In accordance with at least one aspect of the above method, the method may include where the one or more embedded attributes are received via one or more development tools of applications or interfaces and/or productivity tools used to generate documents or other type of content.

In accordance with at least one aspect of the above method, the method may include where the one or more embedded attributes are embedded around the HTML textArea of the email body that provides guidance to the AI to write in the same tone as other emails previously sent to a particular recipient.

In accordance with at least one aspect of the above method, the method may include where the one or more embedded attributes are embedded in an online forum or a social media site and are designed to guide a tone of a discussion or to guide a writing assistance to follow rules of the online forum or the social media site.

In accordance with at least one aspect of the above method, the method may include where the one or more embedded attributes are different embedded attributes around each text field on a webpage and include examples of appropriate responses that can be used as guidance to the one or more generative AI systems.

In accordance with at least one example of the present disclosure, a computing device for directing behavior of a generative artificial intelligence (AI) system is provided. The computing device may include a processor and a memory having a plurality of instructions stored thereon that, when executed by the processor, causes the computing device to obtain an input prompt associated with a requested task for one or more generative artificial intelligence (AI) systems, obtain one or more attributes based on the input prompt, modify the input prompt based on the one or more embedded attributes, and provide the modified input prompt to the one or more generative AI systems.

In accordance with at least one aspect of the above computing device, the computing device may include where to obtain one or more embedded attributes based on the input prompt includes to determine if the one or more embedded attributes are embedded in one or more applications, documents, interfaces, and/or contents that are intended to communicate with the one or more generative AI systems to perform the requested task based on the input prompt.

In accordance with at least one aspect of the above computing device, the computing device may include where the one or more embedded attributes are received via one or more development tools of applications or interfaces and/or productivity tools used to generate documents or other type of content.

In accordance with at least one aspect of the above computing device, the computing device may include where the one or more embedded attributes are embedded around the HTML textArea of the email body that provides guidance to the AI to write in the same tone as other emails previously sent to a particular recipient.

In accordance with at least one aspect of the above computing device, the computing device may include where the one or more embedded attributes are embedded in an online forum or a social media site and are designed to guide a tone of a discussion or to guide a writing assistance to follow rules of the online forum or the social media site.

In accordance with at least one aspect of the above computing device, the computing device may include where the one or more embedded attributes are different embedded attributes around each text field on a webpage and include examples of appropriate responses that can be used as guidance to the one or more generative AI systems.

In accordance with at least one aspect of the above computing device, the computing device may include where the one or more generative AI systems includes one or more generative large language machine learning models, one or more transformer models, and/or a combination of machine learning models.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

What is claimed is:

1. A method for directing behavior of a generative artificial intelligence (AI) system, the method comprising:
   obtaining an input prompt associated with a requested task for the generative AI system;
   obtaining one or more embedded attributes based on the input prompt, wherein the one or more embedded attributes provide guidance for content generation by the generative AI system;
   modifying the input prompt based on the one or more embedded attributes; and
   providing the modified input prompt to the generative AI system.

2. The method of claim 1, wherein obtaining one or more embedded attributes based on the input prompt includes determining if the one or more embedded attributes are embedded in one or more applications, documents, interfaces, and/or contents that are intended to communicate with the generative AI system to perform the requested task based on the input prompt.

3. The method of claim 1, wherein the one or more embedded attributes include one or more tags, hints, markups, or indications that provide additional instructions to the generative AI system.

4. The method of claim 1, wherein the one or more embedded attributes are embedded in an online forum or a social media site and are designed to guide a tone of a discussion or to guide a writing assistance to follow rules of the online forum or the social media site.

5. The method of claim 1, wherein the one or more embedded attributes are different embedded attributes around each text field on a webpage and include examples of appropriate responses that can be used as guidance to the generative AI system.

6. The method of claim 1, wherein the generative AI system includes at least one of a generative large language machine learning model, a transformer model, and/or a combination of machine learning models.

7. The method of claim 1, wherein the one or more embedded attributes are obtained based on an association with the requested task.

8. A method for directing behavior of a generative artificial intelligence (AI) system, the method comprising:
   obtaining an input prompt associated with a requested task for the generative AI system;
   obtaining one or more attributes based on the input prompt, wherein the one or more attributes provide guidance for content generation by the generative AI system;
   generating, in response to determining that the one or more attributes exist, a supplemental prompt based on the one or more attributes; and
   providing the supplemental prompt and the input prompt to the generative AI system.

9. The method of claim 8, wherein obtaining one or more embedded attributes based on the input prompt includes determining if the one or more embedded attributes are embedded in one or more applications, documents, interfaces, and/or contents that are intended to communicate with the generative AI system to perform the requested task based on the input prompt.

10. The method of claim 9, wherein the one or more embedded attributes are received via one or more development tools of applications or interfaces and/or productivity tools used to generate documents or other type of content.

11. The method of claim 8, wherein the one or more embedded attributes are embedded around the HTML textArea of the email body that provides guidance to the AI to write in the same tone as other emails previously sent to a particular recipient.

12. The method of claim 8, wherein the one or more embedded attributes are embedded in an online forum or a social media site and are designed to guide a tone of a discussion or to guide a writing assistance to follow rules of the online forum or the social media site.

13. The method of claim 8, wherein the one or more embedded attributes are different embedded attributes around each text field on a webpage and include examples of appropriate responses that can be used as guidance to the generative AI system.

14. A computing device for directing behavior of a generative artificial intelligence (AI) system, the computing device comprising:
   a processor; and
   a memory having a plurality of instructions stored thereon that, when executed by the processor, causes the computing device to:
     obtain an input prompt associated with a requested task for the generative artificial intelligence (AI) system;
     obtain one or more embedded attributes based on the input prompt, wherein the one or more embedded attributes provide guidance for content generation by the generative AI system;
     modify the input prompt based on the one or more embedded attributes; and
     provide the modified input prompt to the generative AI system.

15. The computing device of claim 14, wherein to obtain one or more embedded attributes based on the input prompt includes to determine if the one or more embedded attributes are embedded in one or more applications, documents, interfaces, and/or contents that are intended to communicate with the generative AI system to perform the requested task based on the input prompt.

16. The computing device of claim 15, wherein the one or more embedded attributes are received via one or more development tools of applications or interfaces and/or productivity tools used to generate documents or other type of content.

17. The computing device of claim 14, wherein the one or more embedded attributes are embedded around the HTML textArea of the email body that provides guidance to the AI to write in the same tone as other emails previously sent to a particular recipient.

18. The computing device of claim 14, wherein the one or more embedded attributes are embedded in an online forum or a social media site and are designed to guide a tone of a discussion or to guide a writing assistance to follow rules of the online forum or the social media site.

19. The computing device of claim 14, wherein the one or more embedded attributes are different embedded attributes around each text field on a webpage and include examples of appropriate responses that can be used as guidance to the generative AI system.

20. The computing device of claim 14, wherein the generative AI system includes at least one of a generative large language machine learning model, a transformer model, and/or a combination of machine learning models.

* * * * *